US012578542B2

(12) United States Patent
Donchev et al.

(10) Patent No.: US 12,578,542 B2
(45) Date of Patent: Mar. 17, 2026

(54) FIBER OPTIC COMPONENT HOLDER HAVING A VARIABLY SIZED RECEIVING PORTION FOR HOLDING VARIOUS SIZES OF FIBER OPTICAL COMPONENTS OR MULTIPLE FIBER OPTICAL COMPONENTS

(71) Applicant: PPC BROADBAND, INC., East Syracuse, NY (US)

(72) Inventors: Stefan Donchev, Milton Keynes (GB); Afzal V. Abdulsalam, Edathala (IN)

(73) Assignee: PPC BROADBAND, INC., East Syracuse, NY (US)

( * ) Notice: Subject to any disclaimer, the term of this patent is extended or adjusted under 35 U.S.C. 154(b) by 48 days.

(21) Appl. No.: 18/125,692

(22) Filed: Mar. 23, 2023

(65) Prior Publication Data

US 2023/0375788 A1      Nov. 23, 2023

Related U.S. Application Data

(60) Provisional application No. 63/322,731, filed on Mar. 23, 2022.

(51) Int. Cl.
G02B 6/44 (2006.01)

(52) U.S. Cl.
CPC ......... G02B 6/4454 (2013.01); G02B 6/4453 (2013.01)

(58) Field of Classification Search
CPC .......................... G02B 6/4453; G02B 6/4454
See application file for complete search history.

(56) References Cited

U.S. PATENT DOCUMENTS

| 5,208,893 A * | 5/1993 | McCall | .............. G02B 6/44785 |
| | | | 385/135 |
| 6,249,635 B1 * | 6/2001 | Daoud | ................. G02B 6/4471 |
| | | | 385/59 |

(Continued)

FOREIGN PATENT DOCUMENTS

| EP | 4187301 A1 | 5/2023 |
| JP | 2007124175 A | 5/2007 |

(Continued)

OTHER PUBLICATIONS

International Search Report and Written Opinion dated Jun. 7, 2023 in corresponding International Application No. PCT/US2023/016155, 18 pages.

*Primary Examiner* — Michael Stahl
(74) *Attorney, Agent, or Firm* — MH2 TECHNOLOGY LAW GROUP LLP

(57) ABSTRACT

A fiber optic component holder for holding various sizes of fiber optical components or multiple fiber optical components includes a fiber optical component holder portion configured to hold a fiber optical component. The fiber optical component holder portion is configured to include a receiving portion between a first wall portion and a second wall portion, and the receiving portion is configured to receive a fiber optical component such that the fiber optical component urges a biasing portion to increase a dimension of the receiving portion, and wherein a biasing force of the biasing portion is configured to bias the fiber optical component against a retaining portion. The biasing portion is configured to permit the dimension of the receiving portion to be varied such that the fiber optical component holder portion is configured to receive fiber optical components having various dimensions and/or multiple fiber optical components having same or different dimensions.

24 Claims, 13 Drawing Sheets

(56)          References Cited

U.S. PATENT DOCUMENTS

| | | | |
|---|---|---|---|
| 8,380,034 | B2 | 2/2013 | Fleouter et al. |
| 9,383,538 | B2 | 7/2016 | Giraud et al. |
| 10,795,105 | B1 | 10/2020 | Li |
| 2007/0047892 | A1* | 3/2007 | Bayazit ............... G02B 6/4454 |
| | | | 385/135 |
| 2010/0183274 | A1* | 7/2010 | Brunet ................ G02B 6/4452 |
| | | | 385/135 |
| 2010/0303430 | A1 | 12/2010 | Fleouter et al. |
| 2010/0316348 | A1* | 12/2010 | Lapp ................... G02B 6/4471 |
| | | | 385/137 |
| 2011/0299823 | A1 | 12/2011 | Bran De Leon et al. |
| 2019/0086626 | A1 | 3/2019 | Kubinski |
| 2022/0291470 | A1 | 9/2022 | Claessens et al. |
| 2023/0168455 | A1* | 6/2023 | Corbille .............. G02B 6/4471 |
| | | | 385/135 |
| 2023/0236378 | A1 | 7/2023 | Blackwell, Jr. et al. |
| 2023/0324624 | A1* | 10/2023 | Trezise ............... G02B 6/4454 |
| | | | 385/134 |
| 2024/0053564 | A1 | 2/2024 | Shu et al. |

FOREIGN PATENT DOCUMENTS

| | | | |
|---|---|---|---|
| JP | 4889592 | B2 | 3/2012 |
| WO | WO 2007/129953 | A1 * | 11/2007 |
| WO | WO 2009/091457 | A1 * | 7/2009 |

* cited by examiner

FIBER OPTIC COMPONENT HOLDER HAVING A VARIABLY SIZED RECEIVING PORTION FOR HOLDING VARIOUS SIZES OF FIBER OPTICAL COMPONENTS OR MULTIPLE FIBER OPTICAL COMPONENTS

CROSS-REFERENCE TO RELATED APPLICATIONS

This application claims the benefit of U.S. Provisional Application No. 63/322,731 filed Mar. 23, 2022, the disclosure of which is hereby incorporated by reference herein in its entirety.

TECHNICAL FIELD

The present disclosure generally relates to the fiber optic component holders and, more particularly, to a fiber optic component holder having a variably sized receiving portion for holding various sizes of fiber optical components or multiple fiber optical components.

BACKGROUND

Optical fibers are commonly used in the telecommunication field. Many optical fibers must be spliced and connected and distributed, and therefore systems for the management or organization of optical fibers are used to a growing extent. It is necessary to have an optimum organization of the fibers and furthermore the capabilities to conduct modifications and changes in a controlled manner whereby these changes should preferably be carried out so that if at all possible only those optical fibers that have to be changed and modified are moved while all other optical fibers essentially remain untouched so that undesired disturbances are avoided. This is particularly important since in the telecommunication area to a growing extent data are transmitted besides the pure transmission of voice signals, and interference with or interruption of these signals would be very disadvantageous.

These systems for the management or organization of the optical fibers are typically used in central office locations and are placed into modular optical distribution frames or racks.

Usually a large number of protected optical fibers enter the distribution frame or rack and have to be distributed, which can be achieved by splicing. The ends of the incoming optical fibers are spliced to individual optical fibers of a short length, the other end of which is already connected to an optical connector. The two ends are spliced together with well-known techniques and the excess length is arranged in specially designed cassettes, which typically contain a certain number of optical fibers. The further distribution is then achieved through a connection to another position in the entire distribution network through the equivalent of so-called jumper fibers.

Due to the high number of connections to be established, and the limited number of connections to be made within each cassette, it is necessary to use multiple cassettes which house spliced fibers. Typically, the cassettes are placed on rails or racks into which they are placed side by side so that they can be moved at a certain angle. This allows one to flip the cassettes like pages of a book so that any desired individual cassette can be reached in order to achieve any kinds of modifications. These can be the addition of new connections or the change of connections, a repair and the like. These systems are widely used but it was recognized that they present some problems.

As telecommunication cables are routed across data networks, it is necessary to periodically open the cable so that one or more telecommunication lines therein may be spliced, thereby allowing data to be distributed to other cables or "branches" of the telecommunication network. The cable branches may be further distributed until the network reaches individual homes, businesses, offices, premises, and so on.

At each point where a telecommunication cable is opened, a cassette may be provided to protect the exposed interior of the cable. Commonly, the enclosure has one or more ports through which cables enter and/or exit the enclosure. Once inside the cassette, the cable is opened to expose the telecommunication lines therein. Conventional telecommunication enclosures are constructed to facilitate the management and protection of individual telecommunication lines and splices thereof.

Frequently, these telecommunication cassettes include fiber optic splice trays to interconnect a plurality of optical fibers. With increasing bandwidth demands, telecommunication companies are seeking new ways to increase connection densities within their existing infrastructure. However, space is frequently at a premium. Thus, there is a need for new more dense and compact components for use in telecommunication enclosures.

It may be desirable to provide a fiber optic component holder having a variably sized receiving portion for holding various sizes of fiber optical components or multiple fiber optical components. For example, it may be desirable to provide a fiber optic component holder with a fiber optic component holder portion having the variably sized receiving portion for holding various sizes of fiber optical components or multiple fiber optical components. In some aspects, it may be desirable to provide a fiber optic component holder portion with a biasing portion that provides the fiber optical component holder portion with the variable sized receiving portion such that the fiber optical component holder portion is configured to receive various sized fiber optical components and/or multiple fiber optical components of the same or different sizes.

SUMMARY

According to an embodiment of the disclosure, a fiber optic component holder for holding various sizes of fiber optical components or multiple fiber optical components may include a base portion, a splice protector holder portion configured to hold a splice protector that is configured to protect spliced fibers, and a fiber optical component holder portion configured to hold a fiber optical component. The splice protector holder portion may be disposed on a top surface of the base portion, and the fiber optical component holder portion may be disposed on the top surface of the base portion between the splice protector holder portion and an end portion of the base portion. The fiber optical component holder portion may include a first wall portion and a second wall portion that are configured to be spaced apart from one another in a first direction, and the fiber optical component holder portion may be configured to include a receiving portion between the first wall portion and the second wall portion. The fiber optical component holder portion may be configured to include a first biasing portion that is configured to extend from the first wall portion toward the second wall portion, and the first biasing portion may be configured to be urged away from the second wall portion and toward the first wall portion to increase a dimension of the receiving portion in the first direction. The fiber optical component holder portion may be configured to include a second biasing portion that is configured to extend from the top surface of the base portion, and the second biasing portion is configured to be urged toward the base portion to increase a dimension of the receiving portion in a second direction that is perpendicular to the first direction. The receiving portion may be configured to receive a fiber optical component such that the fiber optical component engages the first biasing portion and the second wall portion and urges the first biasing portion away from the second wall portion, and wherein and a biasing force of the first biasing portion is configured to bias the fiber optical component against the second wall portion. The receiving portion may be configured to receive a fiber optical component such that the fiber optical component engages the second biasing portion and urges the second biasing portion toward the base portion, and wherein a biasing force of the second biasing portion is configured to bias the fiber optical component against a retaining portion in the second direction. The first biasing portion and the second biasing portion may be configured to permit a dimension of the receiving portion to be varied such that the fiber optical component holder portion is configured to receive fiber optical components having various dimensions and/or multiple fiber optical components having same or different dimensions.

In some embodiments, the fiber optical component holder portion may be configured to hold a passive fiber optical component.

In some embodiments, the fiber optical component holder portion may be configured to hold a planar lightwave circuit splitter, a fused biconical taper splitter, or a wavelength division multiplexing module.

In some embodiments, the splice protector holder portion may include a plurality of splice protector holders, and each splice protector holders may be configured to hold a splice protector.

In some embodiments, the fiber optical component holder portion may include two fiber optic component holder portions.

In some embodiments, the first biasing portion may include two biasing structures.

In some embodiments, the second biasing portion may include two biasing structures.

According to an embodiment of the disclosure, a fiber optic component holder for holding various sizes of fiber optical components or multiple fiber optical components may include a fiber optical component holder portion configured to hold a fiber optical component. The fiber optical component holder portion may be configured to include a receiving portion between a first wall portion and a second wall portion. The fiber optical component holder portion may be configured to include a first biasing portion that is configured to extend from the first wall portion toward the second wall portion and to be urged away from the second wall portion to increase a dimension of the receiving portion in a first direction, and the fiber optical component holder portion may be configured to include a second biasing portion that is configured to be urged in a second direction that is perpendicular to the first direction to increase a dimension of the receiving portion in the second direction. The receiving portion may be configured to receive a fiber optical component such that the fiber optical component urges the first biasing portion away from the second wall portion, and wherein and a biasing force of the first biasing portion is configured to bias the fiber optical component against the second wall portion. The receiving portion may be configured to receive a fiber optical component such that the fiber optical component urges the second biasing portion to increase the dimension of the receiving portion in the second dimension, and wherein a biasing force of the second biasing portion is configured to bias the fiber optical component against a retaining portion in the second direction. The first biasing portion and the second biasing portion may be configured to permit a dimension of the receiving portion to be varied such that the fiber optical component holder portion is configured to receive fiber optical components having various dimensions and/or multiple fiber optical components having same or different dimensions.

In some embodiments, the fiber optical component holder portion may be configured to hold a passive fiber optical component.

In some embodiments, the fiber optical component holder portion may be configured to hold a planar lightwave circuit splitter, a fused biconical taper splitter, or a wavelength division multiplexing module.

In some embodiments, the fiber optic component holder may further comprise a splice protector holder portion that is configured to hold a splice protector that is configured to protect spliced fibers. In some embodiments, the splice protector holder portion may include a plurality of splice protector holders, and each splice protector holders may be configured to hold a splice protector.

In some embodiments, the fiber optical component holder portion may include two fiber optic component holder portions.

In some embodiments, the first biasing portion may include two biasing structures.

In some embodiments, the second biasing portion may include two biasing structures.

According to an embodiment of the disclosure, a fiber optic component holder for holding various sizes of fiber optical components or multiple fiber optical components includes a fiber optical component holder portion configured to hold a fiber optical component. The fiber optical component holder portion may be configured to include a receiving portion between a first wall portion and a second wall portion, and the receiving portion may be configured to receive a fiber optical component such that the fiber optical component urges a biasing portion to increase a dimension of the receiving portion, and wherein a biasing force of the biasing portion is configured to bias the fiber optical component against a retaining portion. The biasing portion may be configured to permit the dimension of the receiving portion to be varied such that the fiber optical component holder portion is configured to receive fiber optical components having various dimensions and/or multiple fiber optical components having same or different dimensions.

In some embodiments, the fiber optical component holder portion may be configured to hold a passive fiber optical component.

In some embodiments, the fiber optical component holder portion may be configured to hold a planar lightwave circuit splitter, a fused biconical taper splitter, or a wavelength division multiplexing module.

In some embodiments, the fiber optic component holder may further comprise a splice protector holder portion that is configured to hold a splice protector that is configured to protect spliced fibers. In some embodiments, the splice protector holder portion may include a plurality of splice protector holders, and each splice protector holders may be configured to hold a splice protector.

In some embodiments, the fiber optical component holder portion may include two fiber optic component holder portions.

In some embodiments, the biasing portion may include two biasing structures.

In some embodiments, the fiber optical component holder portion may be configured to include a second biasing portion that is configured to extend from the first wall portion toward the second wall portion and to be urged away from the second wall portion to increase a second dimension of the receiving portion in a direction perpendicular to a direction of the dimension. In some embodiments, the second biasing portion may include two biasing structures.

BRIEF DESCRIPTION OF THE DRAWINGS

Further advantages and features of the present disclosure will become apparent from the following detailed description and the accompanying drawings.

DETAILED DESCRIPTION

Figure 1:
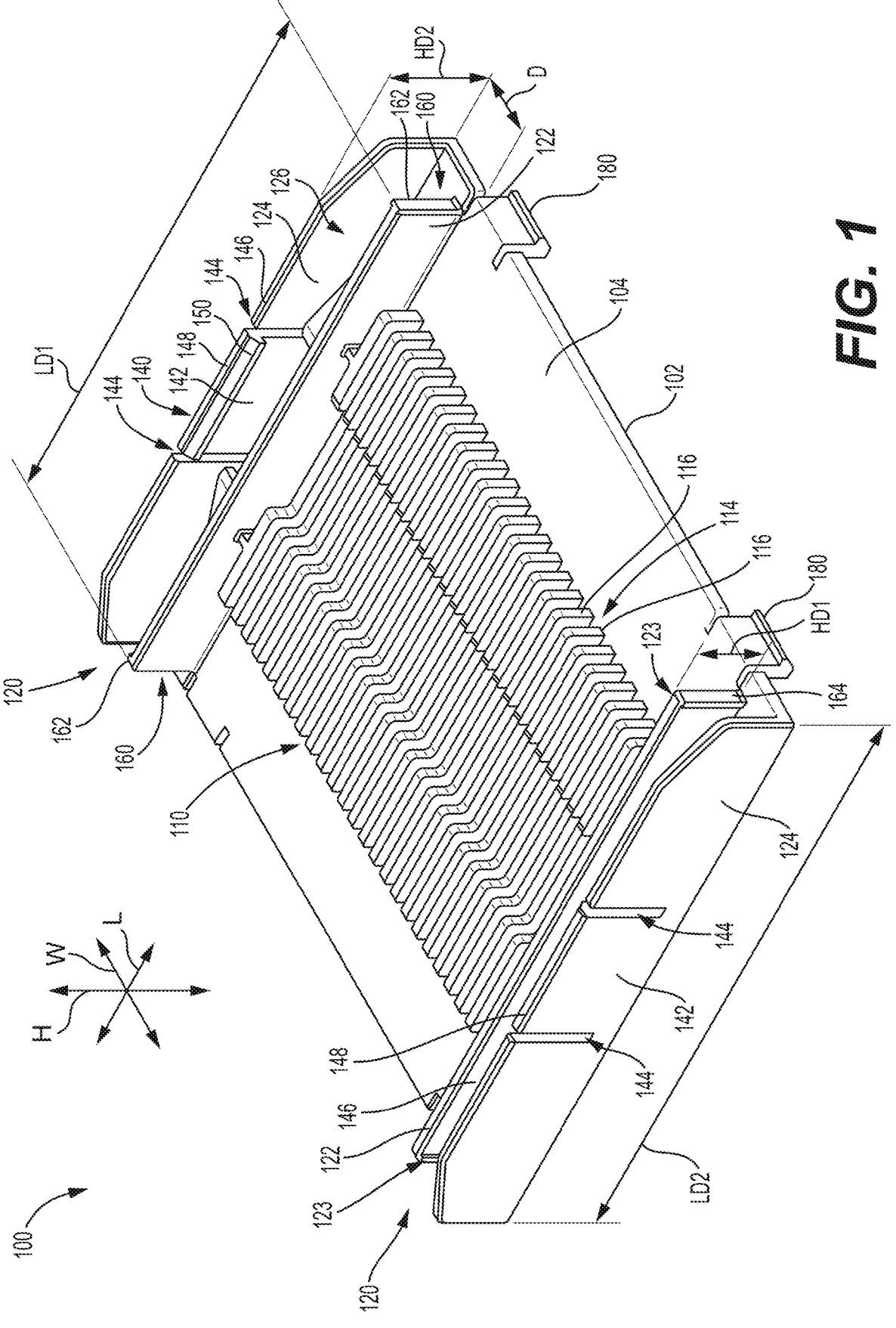
FIG. 1 illustrates a top isometric view of an exemplary fiber optic component holder in accordance with various aspects of the disclosure.

Reference will now be made in detail to presently preferred embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure. Furthermore, the terminology used herein is used only for the purpose of describing particular embodiments of the present disclosure and is not intended to be limiting in any way.

As used in the specification and the appended claims, the singular form "a," "an," and "the" include plural referents unless the context clearly indicates otherwise. For example, reference to a component in the singular is intended to also include a plurality of components.

FIGS. 1-6 illustrate an exemplary fiber optic component holder 100 in accordance with various aspects of the disclosure. In the embodiment of FIGS. 1-6, the holder 100 includes a base portion 102, a splice protector holder portion 110, and a fiber optical component holder portion 120. The fiber optical component holder portion 120 is configured to hold one or more fiber optical components such as, for example, a passive fiber optical component including, but not limited to, a planar lightwave circuit splitter (PLC splitter), a fused biconical taper splitter (FBT splitter), and/or a wavelength division multiplexing module (WDM module).

The splice protector holder portion 110 includes one or more splice protector holders 114 disposed on a top surface 104 of the base portion 102. In the illustrated embodiment, the splice protector holder portion 110 includes a row of twenty-four holders 114 configured to hold twenty-four (24) splice protectors (not shown), for example, ANT crimp splice protectors. Each splice protector holder 114 may include a two parallel wall portions 116 that extend from the top surface 104 of the base portion 102. The two parallel wall portions 116 are spaced apart by a distance that is sized and arranged to receive a splice protector in an interference fit or friction fit relationship, as would be understood by persons skilled in the art. As is well known in the art of fiber optics, when ends of two fibers are spliced together, the fiber optic splice is typically protected by a protection element. For example, in some aspects, fiber optic fusion splices may be protected by a crimp splice protection element comprising a V-shaped metal sleeve. In some aspects, the fiber optic splice may be protected by a heat shrink protection sleeve.

The fiber optical component holder portion 120 may be disposed at an end of the splice protector holder portion 110, that is, at an end of the row of splice protector holders 114. In the illustrated embodiment, the fiber optic component holder 100 includes two fiber optical component holder portions 120—one at each end of the row of splice protector holders 114. It should be understood that some embodiments of the fiber optic component holder 100 may include one fiber optical component holder portion 120 or more than two fiber optical component holder portions 120.

Figure 2:
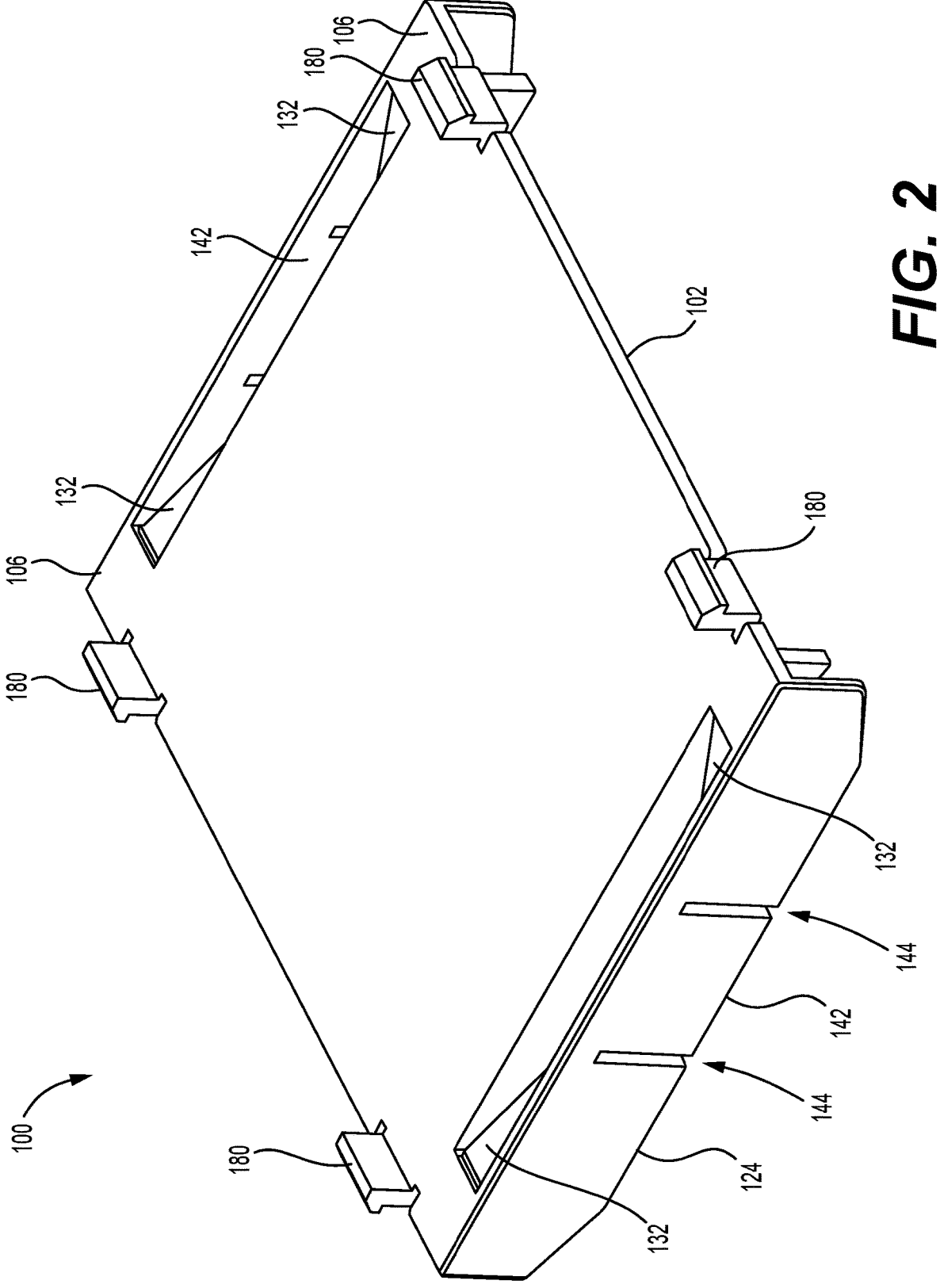
FIG. 2 illustrates a bottom isometric view of the fiber optic component holder of FIG. 1.
Figure 3:
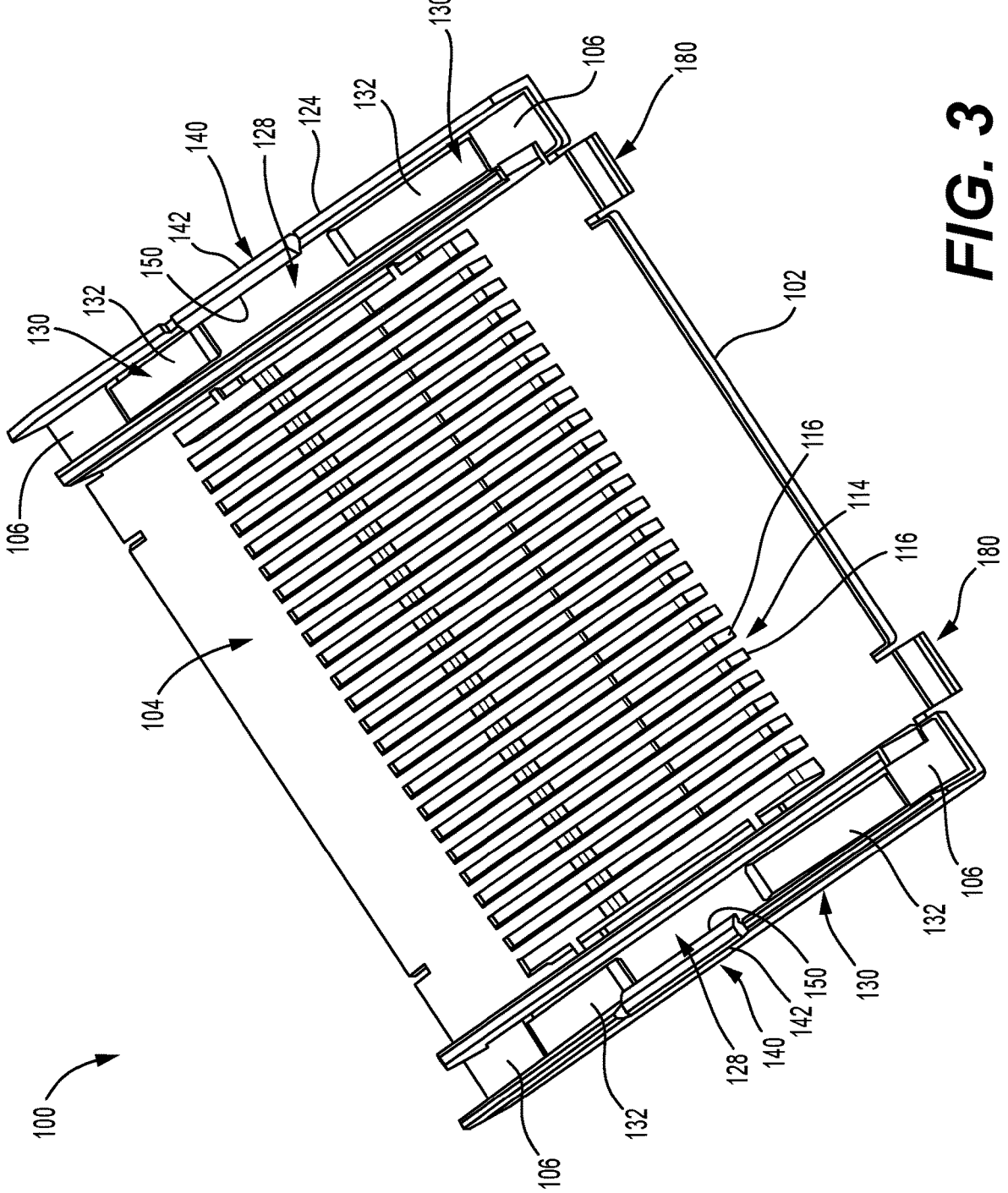
FIG. 3 illustrates a top view of the fiber optic component holder of FIG. 1.

The fiber optical component holder portion 120 includes a first wall portion 122 extending from the top surface 104 of the base portion 102 and a second wall portion 124 extending from the top surface 104 of the base portion 102. The first wall portion 122 and the second wall portion 124 are parallel to one another and are separated from one another in a first direction W by a distance D that is sized to receive a fiber optical component. For example, as best shown in FIGS. 1-3, the first wall portion 122 and the second wall portion 124 have a height dimension HD1, HD2 in a second direction H and a length dimension LD1, LD2 in a third direction L. The height dimensions HD1, HD2 may be the same or different, and the length dimensions LD1, LD2 may be the same or different.

Figure 4:
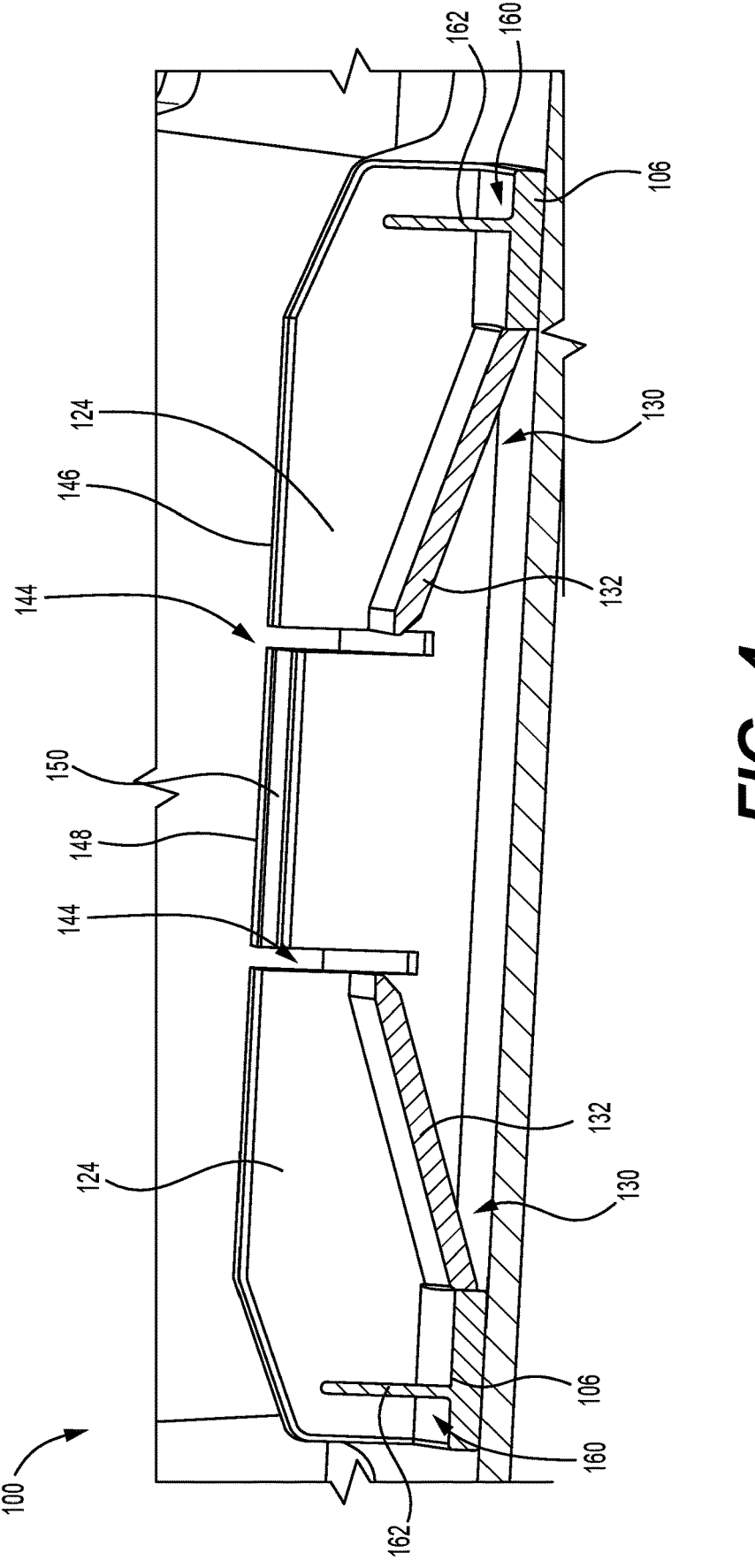
FIG. 4 illustrates a cross-sectional side view of the fiber optic component holder of FIG. 1.
Figure 5:
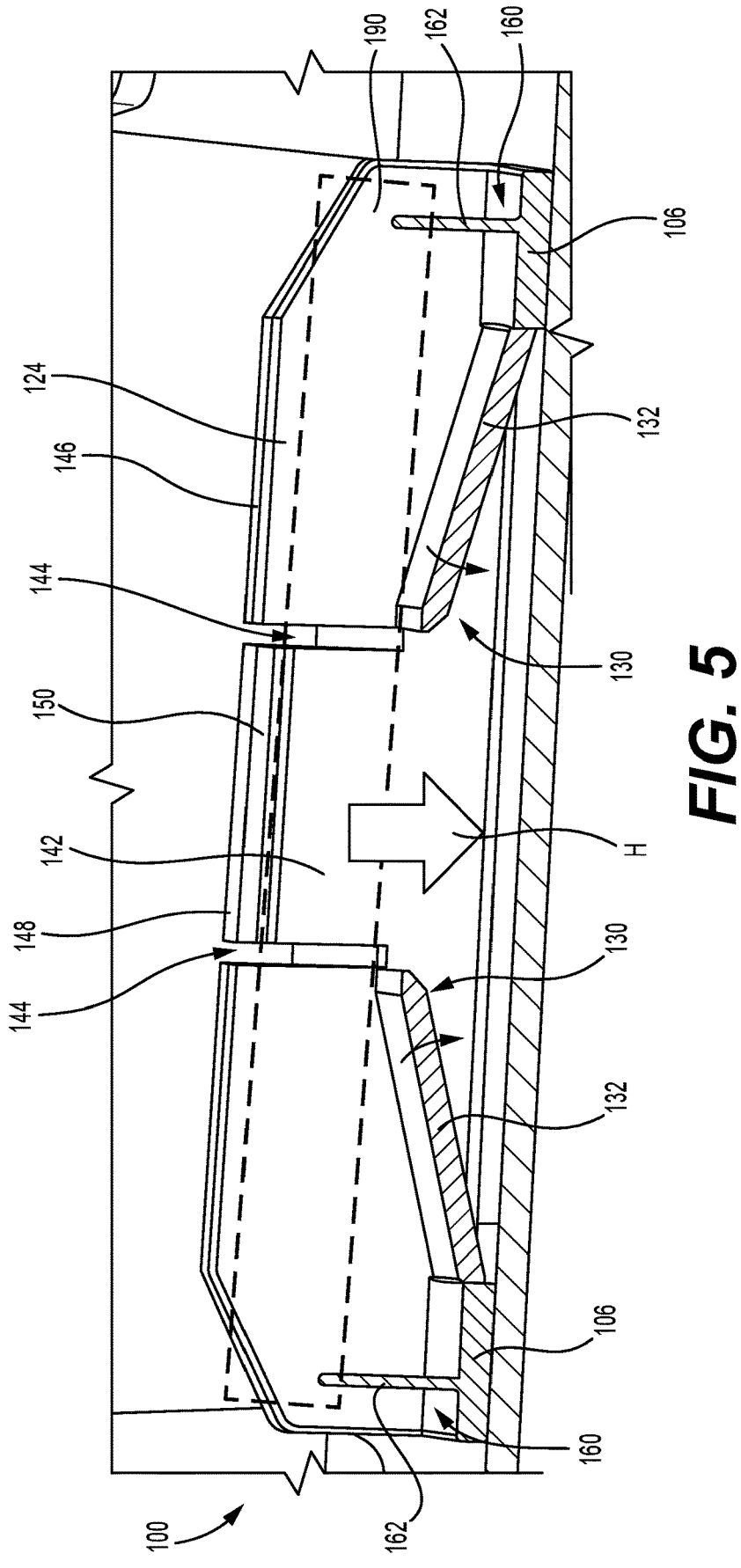
FIG. 5 illustrates a cross-sectional side view of the fiber optic component holder of FIG. 1 with an exemplary fiber optic component.

Referring now to FIGS. 3-5, the fiber optical component holder portion 120 further includes a biasing portion 130 extending from the top surface 104 of the base portion 102 at an acute angle relative to the top surface 104 of the base portion 102. The biasing portion 130 includes a biasing structure 132, for example, a flexible finger, that extends from an end portion 106 of the base portion 102 that extends between the first wall portion 122 and the second wall portion 124. The biasing structure 132 is configured to be urged toward the base portion in the second direction H, for example, a vertical direction. In the illustrated embodiment, the fiber optical component holder portion includes two biasing portions 130, with each biasing portion 130 extending toward one another from the end portion 106 of the base portion 102 that extends between the first wall portion 122 and the second wall portion 124.

As best illustrated in FIGS. 4 and 5, the fiber optical component holder portion 120 also includes a first retaining portion 140 and a second retaining portion 160. The first retaining portion 140 may include a flexible portion 142 of the second wall portion 124. In the illustrated embodiment, the flexible portion 142 is separated from a remainder of the second wall portion 124 by slits 144 extending from a free end 146 of the second wall portion 124 toward the base portion 102. In some aspects, all or any part of the second wall portion 124 may comprise the flexible portion.

The flexible portion 142 includes a free end 148 having a retaining structure 150, for example, a lip portion, that extend from the free end 148 toward the first wall portion 122. The flexible portion 142 is configured to be urged away from the first wall portion 122 when a fiber optical component is inserted into the fiber optical component holder portion 120 in the second direction H, for example, a vertical direction, as described in more detail below.

The second retaining portion 160 includes a retaining structure 162 extending from the first wall portion 122 toward the second wall portion 124 in the first direction W. For example, the retaining structure 162 may comprise a lip portion 164 extending from an end 123 of the first wall portion 122. In some aspects, the retaining structure 162 may be spaced from the end 123 of the first wall portion 122. In the illustrated embodiment, the second retaining portion 160 includes retaining structures 162 extending from each end 123 of the first wall portion 122. The second retaining portion 160 is configured to restrict movement of a fiber optical component in the third direction L when the fiber optical component is inserted into the fiber optical component holder portion 120, as described in more detail below.

Figure 6:
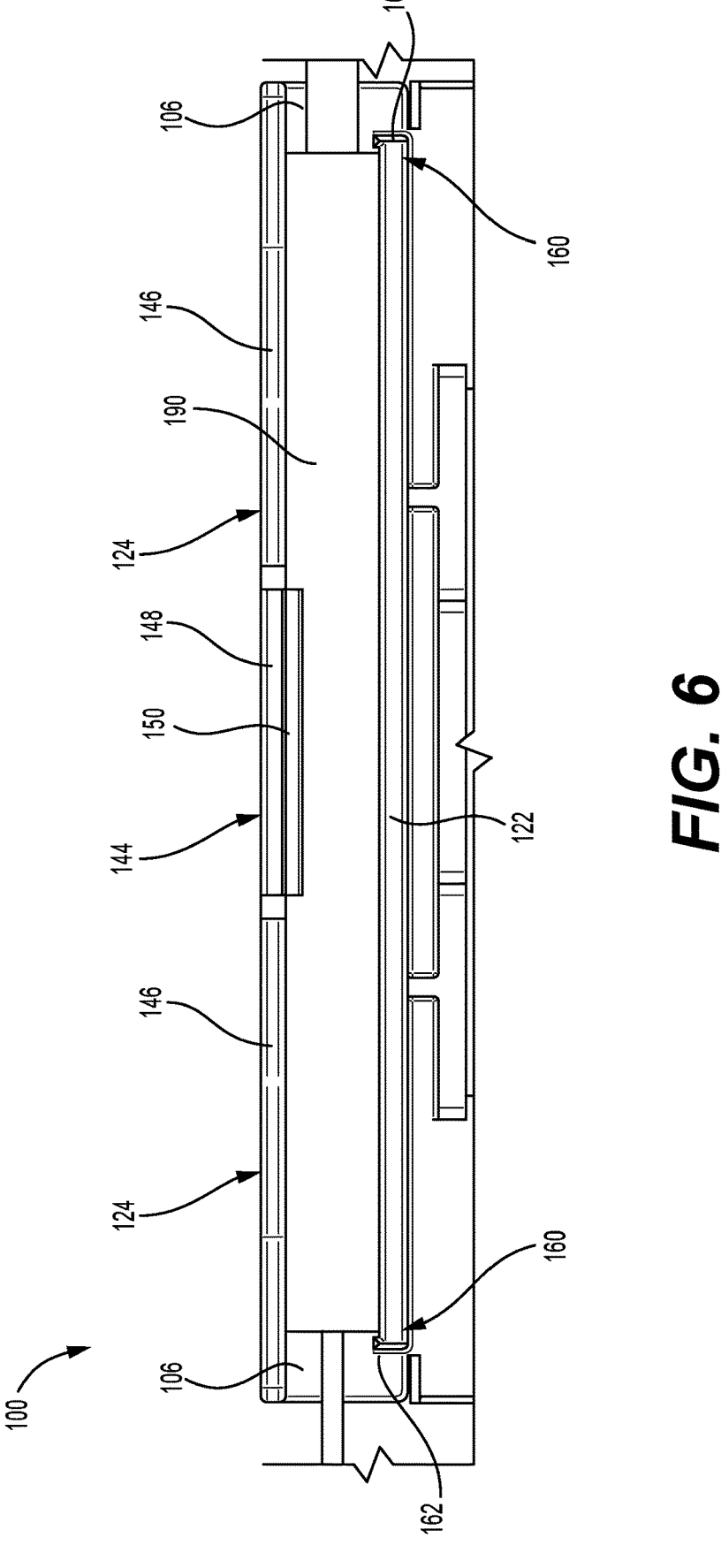
FIG. 6 illustrates a partial, enlarged top view of the fiber optic component holder of FIG. 1 with a splitter.
Figure 7:
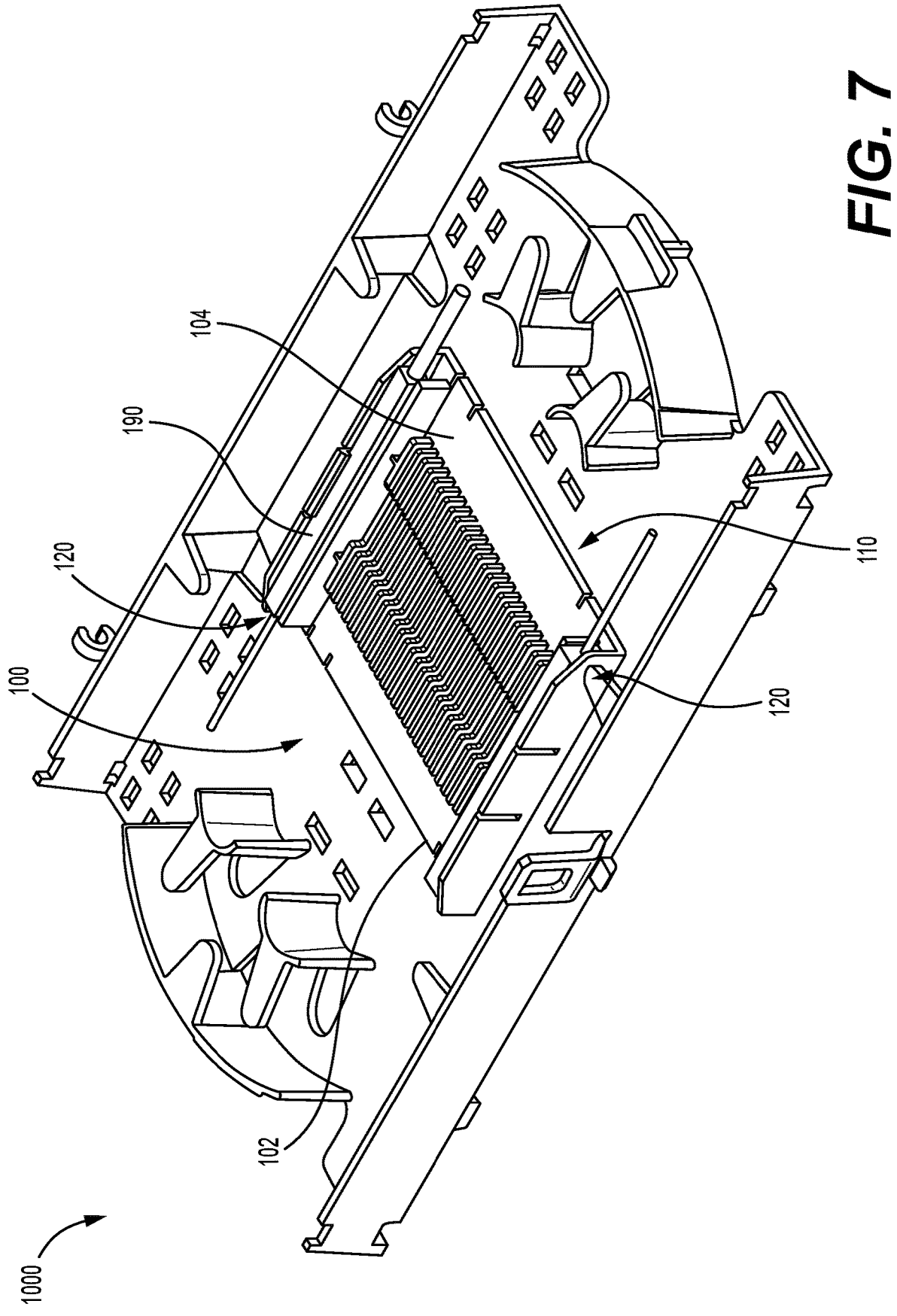
FIG. 7 illustrates an isometric view of an exemplary fiber optic tray including the fiber optic component holder of FIG. 1.
Figure 8:
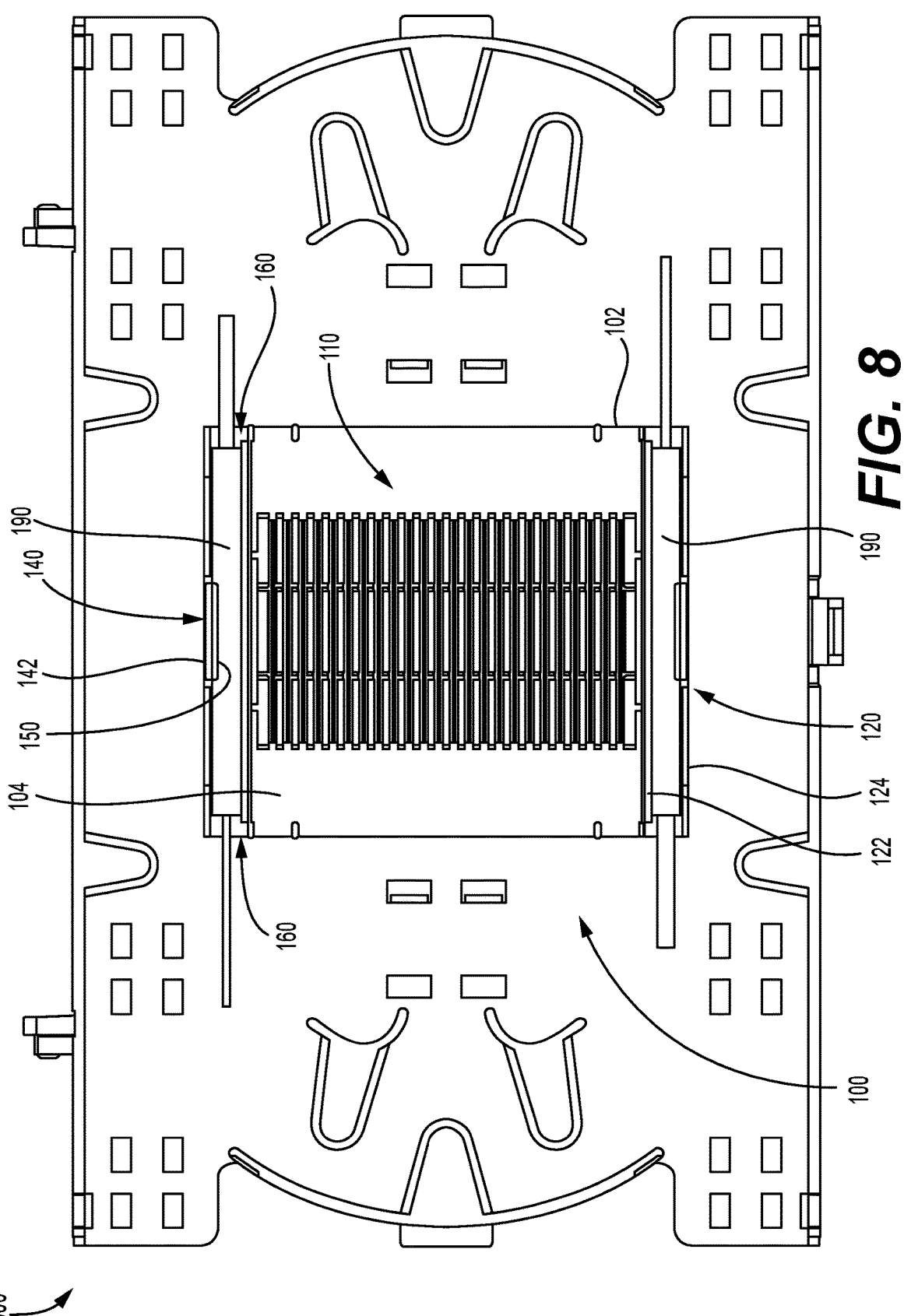
FIG. 8 illustrates a top view of the fiber optic tray with fiber optic component holder of FIG. 7 with exemplary fiber optic components.

Referring now to FIGS. 4-6, use of the fiber optical component holder portion 120 is described. The fiber optical component holder portion 120 is configured to receive a fiber optical component 190 in the second direction H, for example, a vertical direction, by way of an opening 126 between the first wall portion 122 and the second wall portion 124. The fiber optical component 190 may have a cuboid configuration with a first dimension C1, for example, a width dimension, sized smaller than a dimension of the opening 126 in the first direction W, a second dimension C2, for example, a height dimension, sized to be received between the top surface 104 of the base portion 102 and first retaining portion 140 in the second direction H, and a third dimension C3, for example, a length dimension, sized to be received by the second retaining portion 160 in the third direction L.

The fiber optical component 190 can be inserted into the opening 126 between the second retaining portion 160 in the third direction L and beyond the first retaining portion 140 in the second direction H. The fiber optical component 190 is urged into engagement with the biasing portion 130 so as to urge the biasing portion 130 toward the base portion 102. The flexibility of the biasing portion 130 permits the biasing portion 130, and thus the fiber optical component holder portion 120, to define a receiving portion 128 having a variable dimension in the second direction W. After the fiber optical component 190 is inserted into the receiving portion 128, a biasing force of the biasing portion 130 urges the biasing portion 130 away from the base portion 102 such that the biasing portion 130 urges the fiber optical component 190 toward the first retaining portion 140 and holds the fiber optical component 190 between the biasing portion 130 and the first retaining portion 140 in the second direction H.

As described above, the biasing portion 130 provides the fiber optical component holder portion 120 with a variable sized receiving portion 128 that is configured to receive various sized fiber optical components and/or multiple fiber optical components of the same or different sizes.

Depending on the first dimension C1 and/or the second dimension C2 of the fiber optical component 190, the receiving portion 128 may be configured to receive more than one fiber optical component 190 in the first direction W and/or more than one fiber optical component 190 in the second direction H.

FIGS. 9-13 illustrate another exemplary fiber optic component holder 200 in accordance with various aspects of the disclosure. The holder 200 includes a base portion 202, a splice protector holder portion 210, and a fiber optical component holder portion 220. The fiber optical component holder portion 220 is configured to hold one or more fiber optical components such as, for example, a passive fiber optical component including, but not limited to, a planar lightwave circuit splitter (PLC splitter), a fused biconical taper splitter (FBT splitter), and/or a wavelength division multiplexing module (WDM module).

The splice protector holder portion 210 includes one or more splice protector holders 214 disposed on a top surface 204 of the base portion 202. In the illustrated embodiment, the splice protector holder portion 210 includes a row of twenty-four holders 214 configured to hold twenty-four (24) splice protectors (not shown), for example, ANT crimp splice protectors. Each splice protector holder 214 may include a two parallel wall portions 216 that extend from the top surface 204 of the base portion 202. The two parallel wall portions 216 are spaced apart by a distance that is sized and arranged to receive a splice protector in an interference fit or friction fit relationship, as would be understood by persons skilled in the art. As is well known in the art of fiber optics, when ends of two fibers are spliced together, the fiber optic splice is typically protected by a protection element. For example, in some aspects, fiber optic fusion splices may be protected by a crimp splice protection element comprising a V-shaped metal sleeve. In some aspects, the fiber optic splice may be protected by a heat shrink protection sleeve.

The fiber optical component holder portion 220 may be disposed at an end of the splice protector holder portion 210, that is, at an end of the row of splice protector holders 214. In the illustrated embodiment, the fiber optic component holder 200 includes two fiber optical component holder portions 220—one at each end of the row of splice protector holders 214. It should be understood that some embodiments of the fiber optic component holder 200 may include one fiber optical component holder portion 220 or more than two fiber optical component holder portions 220.

The fiber optical component holder portion 220 includes a first wall portion 222 extending from the top surface 204 of the base portion 202 and a second wall portion 224 extending from the top surface 204 of the base portion 202. The first wall portion 222 and the second wall portion 224 are parallel to one another and are separated from one another in a first direction W by a distance D that is sized to receive a fiber optical component. In some aspects, the first wall portion 222 and the second wall portion 224 have a height dimension HD1, HD2 in a second direction H and a length dimension LD1, LD2 in a third direction L. The height dimensions HD1, HD2 may be the same or different, and the length dimensions LD1, LD2 may be the same or different.

Figure 10:
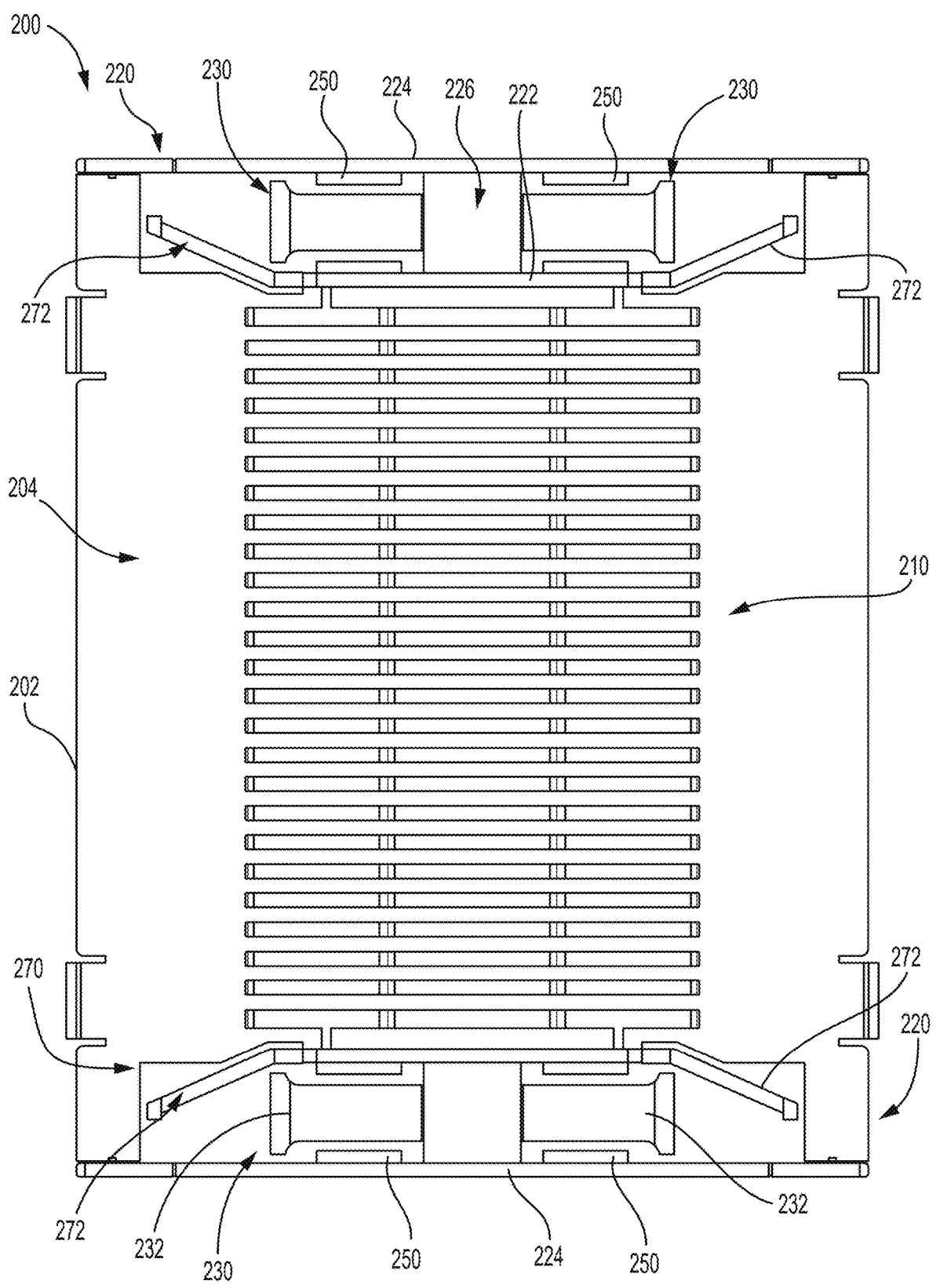
FIG. 10 illustrates a top view of the fiber optic component holder of FIG. 10.
Figure 11:
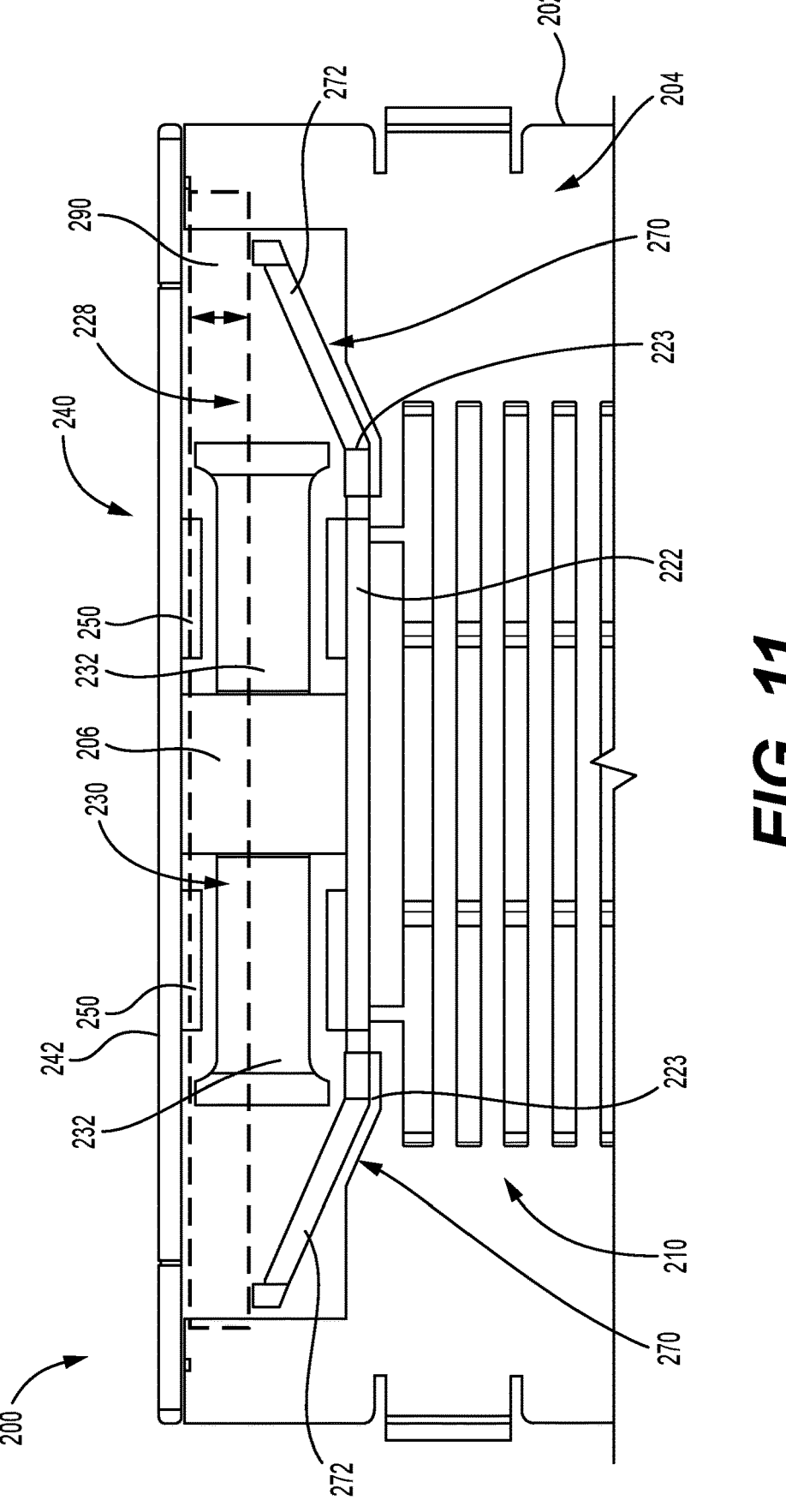
FIG. 11 illustrates a partial, enlarged top view of the fiber optic component holder of FIG. 10.
Figure 12:
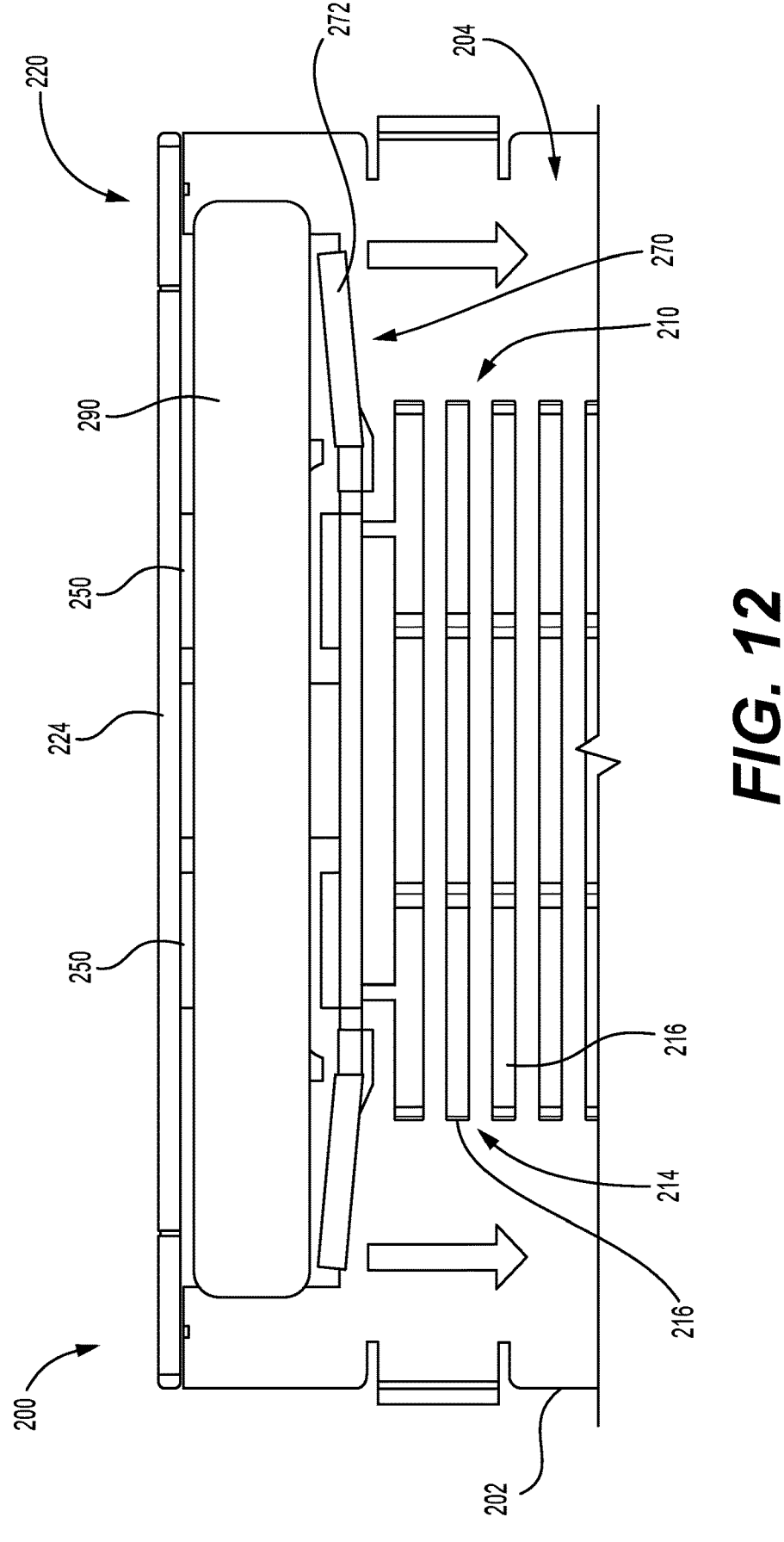
FIG. 12 illustrates a partial, enlarged top view of the fiber optic component holder of FIG. 10 with an exemplary fiber optic component.

Referring now to FIGS. 10-12, the fiber optical component holder portion 220 includes a first biasing portion 270 and a second biasing portion 230. The first biasing portion 270 extends from the first wall portion 222 toward the second wall portion 224 at an acute angle relative to the first wall portion 222. The first biasing portion 270 includes a biasing structure 272, for example, a flexible portion, that extends from an end 223 of the first wall portion 222. The biasing structure 272 is configured to be urged toward the first wall portion 222 in the first direction W. In the illustrated embodiment, the fiber optical component holder portion 220 includes two first biasing portions 270, with each second biasing portion 270 extending away from one another from the ends 223 of the first wall portion 222. The first biasing portion 270 is configured to be urged away from the second wall portion 224 and toward the first wall portion 222 when a fiber optical component is inserted into the fiber optical component holder portion 220 in the second direction H, for example, a vertical direction, as described in more detail below.

Figure 13:
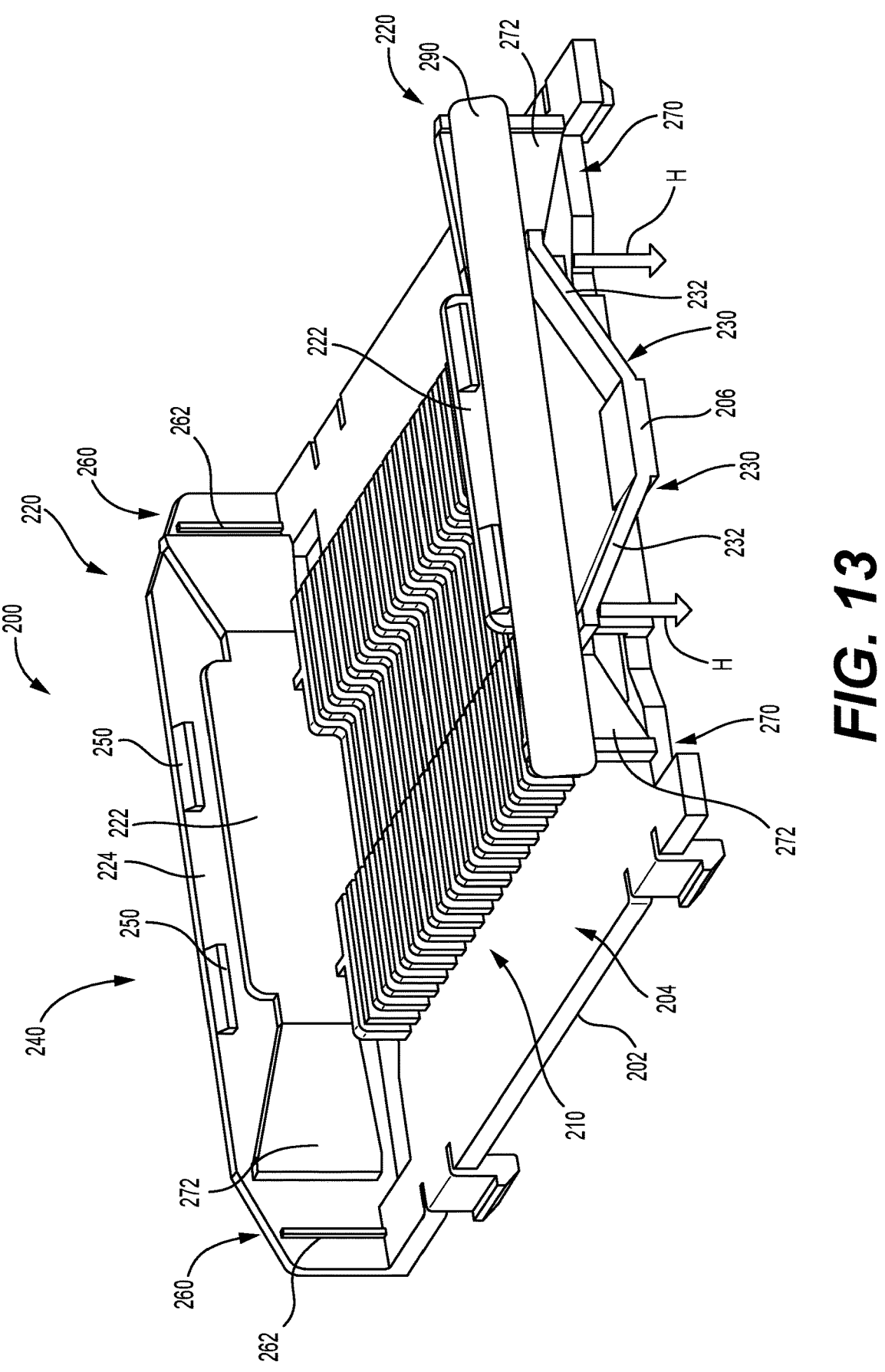
FIG. 13 illustrates an upper isometric view of the fiber optic component holder of FIG. 10 with an exemplary fiber optic component.

Referring to FIG. 13, the second biasing portion 230 extends from the top surface 204 of the base portion 202 at an acute angle relative to the top surface 204 of the base portion 202. The second biasing portion 230 includes a biasing structure 232, for example, a flexible finger, that extends from an end portion 206 of the base portion 202 that extends between the first wall portion 222 and the second wall portion 224. The biasing structure 232 is configured to be urged toward the base portion in the second direction H, for example, a vertical direction. In the illustrated embodiment, the fiber optical component holder portion includes two second biasing portions 230, with each second biasing portion 230 extending away from one another from the end portion 206 of the base portion 202 that extends between the first wall portion 222 and the second wall portion 224.

Figure 9:
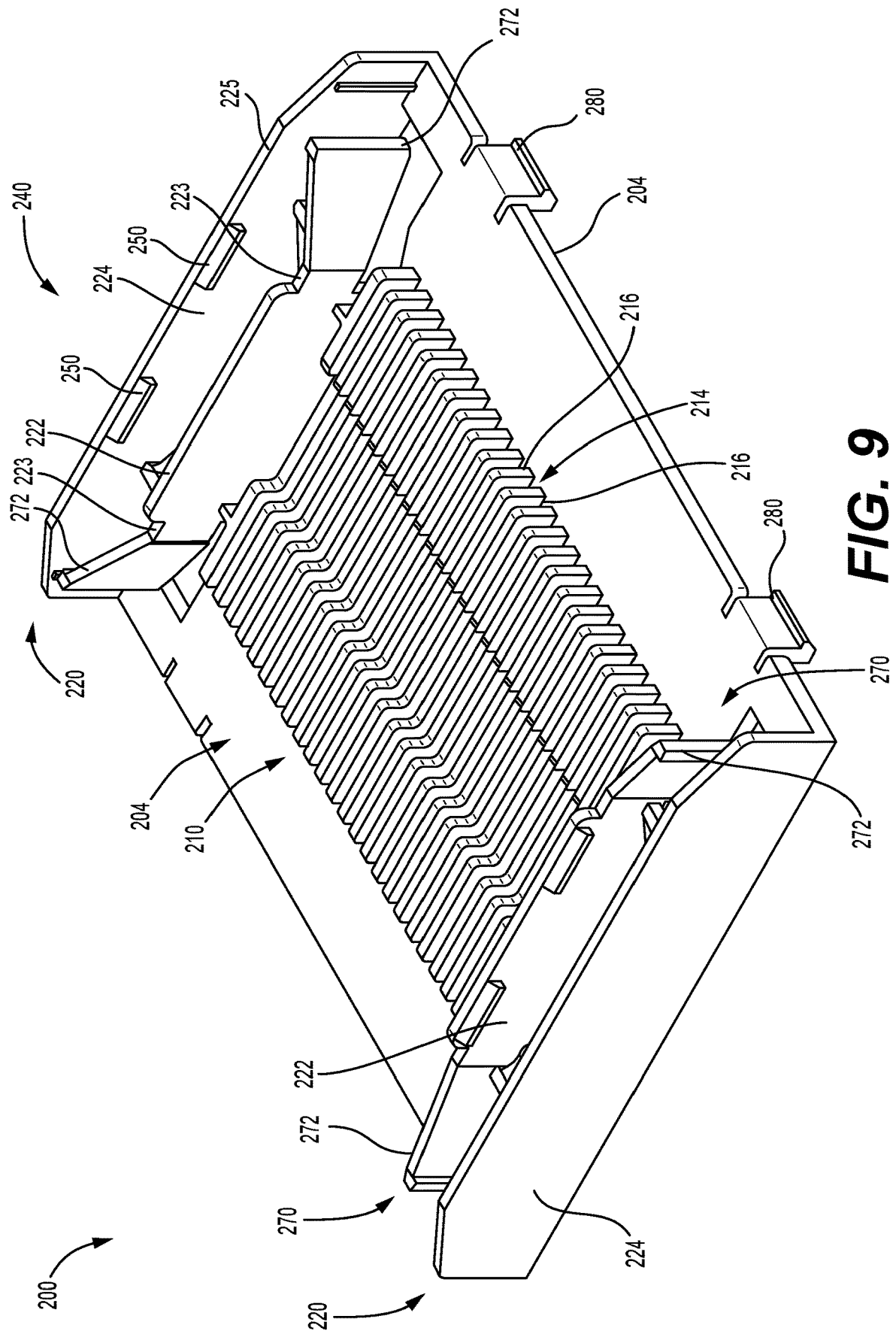
FIG. 9 illustrates an upper isometric view of another exemplary fiber optic component holder in accordance with various aspects of the disclosure.

As best illustrated in FIGS. 9 and 13, the fiber optical component holder portion 220 also includes a first retaining portion 240 and a second retaining portion 260. The first retaining portion 240 includes a retaining structure 250, for example, a lip portion, that extends from the second wall portion 224 toward the first wall portion 122 at a free end 225 of the second wall portion 224. In the illustrated embodiment, the first retaining portion 240 includes two retaining structures 250 spaced apart from one another along the free end 225 of the second wall portion 224.

The second retaining portion 260 includes a retaining structure 262 extending from the second wall portion 224 toward the first wall portion 222 in the first direction W. For example, the retaining structure 262 may comprise a lip portion 264 extending from the second wall portion 224. In the illustrated embodiment, the second retaining portion 260 includes retaining structures 262 extending from the second wall portion 224 near the end of the second wall portion 224. The second retaining portion 260 is configured to restrict movement of a fiber optical component in the third direction L when the fiber optical component is inserted into the fiber optical component holder portion 220, as described in more detail below.

Referring now to FIGS. 10-13, use of the fiber optical component holder portion 220 is described. The fiber optical component holder portion 220 is configured to receive a fiber optical component 290 in the second direction H, for example, a vertical direction, by way of an opening 226 between the first wall portion 222 and the second wall portion 224. The fiber optical component 290 may have a cuboid configuration with a first dimension C1, for example, a width dimension, sized smaller than a dimension of the opening 226 in the first direction W, a second dimension C2, for example, a height dimension, sized to be received between the top surface 204 of the base portion 202 and first retaining portion 240 in the second direction H, and a third dimension C3, for example, a length dimension, sized to be received by the second retaining portion 260 in the third direction L.

The fiber optical component 290 can be inserted into the opening 226 between the second retaining portion 260 in the third direction L and beyond the first retaining portion 240 in the second direction H. The fiber optical component 290 is urged into engagement with the first biasing portion 270 so to urge the first biasing portion 270 away from the second wall portion 204 and toward the first wall portion 222. The flexibility of the first biasing portion 270 permits the first biasing portion 270, and thus the fiber optical component holder portion 220, to define a receiving portion 228 having a variable dimension in the first direction W. After the fiber optical component 290 is inserted into the receiving portion 228, a biasing force urges the first biasing portion 270 back toward the second wall portion 204 such that the first biasing portion 270 urges the fiber optical component 290 toward the second wall portion 204 and holds the fiber optical component 290 between the first biasing portion 270 and the second wall portion in the first direction W.

When the fiber optical component 290 is inserted into the opening 226 beyond the first retaining portion 240 in the second direction H, the fiber optical component 290 is also urged into engagement with the second biasing portion 230 so as to urge the second biasing portion 230 toward the base portion 202. The flexibility of the second biasing portion 230 permits the second biasing portion 230, and thus the fiber optical component holder portion 220, to define a receiving portion 228 having a variable dimension in the second direction W. After the fiber optical component 290 is inserted into the receiving portion 228, a biasing force of the second biasing portion 230 urges the second biasing portion 230 away from the base portion 202 such that the second biasing portion 230 urges the fiber optical component 290 toward the first retaining portion 240 and holds the fiber optical component 290 between the second biasing portion 230 and the first retaining portion 240 in the second direction H.

As described above, the first biasing portion 270 and/or the second biasing portion 230 provide the fiber optical component holder portion 220 with a variable sized receiving portion 228 that is configured to receive various sized fiber optical components and/or multiple fiber optical components of the same or different sizes.

Depending on the first dimension C1 and/or the second dimension C2 of the fiber optical component 290, the receiving portion 228 may be configured to receive more than one fiber optical component 290 in the first direction W and/or more than one fiber optical component 290 in the second direction H.

Referring again to FIGS. 1-3 and 7-9, in some embodiments, the fiber optic component holder 100, 200 may include a coupling portion 180, 280 configured to removably couple the holder 100, 200 with a fiber optic tray or cassette 1000. The fiber optic tray 1000 may include a coupling portion (not shown) configured to removably receive the coupling portion 180, 280 of the holder 100, 200. In some aspects, the fiber optic component holder 100, 200 may be fixedly (i.e., non-removably) coupled with the fiber optic tray 1000. In still other aspects, the fiber optic component holder 100, 200 and the fiber optic tray 1000 may be a single, monolithic piece of unitary construction.

It should be understood that the coupling portion 180, 280 may be configured to removably couple the fiber optic component holder 100, 200 to any other structure of a fiber distribution system that may need to utilize the splice protector holder portion 110, 210 and/or the fiber optical component holder portion 120, 220 of the holder 100, 200.

Further, it should be understood that, in some embodiments, the fiber optic component holder 100, 200 may only include the base portion 102, 202 and the fiber optical component holder portion 120, 220. In such embodiments, the fiber optic component holder 100, 200 may include one fiber optical component holder portion 120, 220 or a plurality of fiber optical component holder portions 120, 220.

While multiple non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fiber optic component holder for holding various sizes of fiber optical components or multiple fiber optical components comprising:

a base portion;

a splice protector holder portion configured to hold a splice protector that is configured to protect spliced fibers;

a fiber optical component holder portion configured to hold a fiber optical component;

wherein the splice protector holder portion is disposed on a top surface of the base portion;

wherein the fiber optical component holder portion is disposed on the top surface of the base portion between the splice protector holder portion and an end portion of the base portion;

wherein the fiber optical component holder portion includes a first wall portion and a second wall portion that are configured to be spaced apart from one another in a first direction;

wherein the fiber optical component holder portion is configured to include a receiving portion between the first wall portion and the second wall portion;

wherein the fiber optical component holder portion is configured to include a first biasing portion that is configured to extend from the first wall portion toward the second wall portion;

wherein the first biasing portion is configured to be urged away from the second wall portion and toward the first wall portion to increase a dimension of the receiving portion in the first direction;

wherein the fiber optical component holder portion is configured to include a second biasing portion that is configured to extend from the top surface of the base portion;

wherein the second biasing portion is configured to be urged toward the base portion to increase a dimension of the receiving portion in a second direction that is perpendicular to the first direction;

wherein the receiving portion is configured to receive a fiber optical component such that the fiber optical component engages the first biasing portion and the second wall portion and urges the first biasing portion away from the second wall portion, and wherein a biasing force of the first biasing portion is configured to bias the fiber optical component against the second wall portion;

wherein the receiving portion is configured to receive a fiber optical component such that the fiber optical component engages the second biasing portion and urges the second biasing portion toward the base portion, and wherein a biasing force of the second biasing portion is configured to bias the fiber optical component against a retaining portion in the second direction; and wherein the first biasing portion and the second biasing portion are configured to permit a dimension of the receiving portion to be varied such that the fiber optical component holder portion is configured to receive fiber optical components having various dimensions and/or multiple fiber optical components having same or different dimensions.

2. The fiber optic component holder of claim 1, wherein the fiber optical component holder portion is configured to hold a passive fiber optical component.

3. The fiber optic component holder of claim 1, wherein the fiber optical component holder portion is configured to hold a planar lightwave circuit splitter, a fused biconical taper splitter, or a wavelength division multiplexing module.

4. The fiber optic component holder of claim 1, wherein the splice protector holder portion includes a plurality of splice protector holders; and wherein each splice protector holders is configured to hold a splice protector.

5. The fiber optic component holder of claim 1, wherein the fiber optical component holder portion includes two fiber optic component holder portions.

6. The fiber optic component holder of claim 1, wherein the first biasing portion includes two biasing structures.

7. The fiber optic component holder of claim 1, wherein the second biasing portion includes two biasing structures.

8. A fiber optic component holder for holding various sizes of fiber optical components or multiple fiber optical components comprising:

a fiber optical component holder portion configured to hold a fiber optical component;

wherein the fiber optical component holder portion is configured to include a receiving portion between a first wall portion and a second wall portion;

wherein the fiber optical component holder portion is configured to include a first biasing portion that is configured to extend from the first wall portion toward the second wall portion and to be urged away from the second wall portion to increase a dimension of the receiving portion in a first direction;

wherein the fiber optical component holder portion is configured to include a second biasing portion that is configured to be urged in a second direction that is perpendicular to the first direction to increase a dimension of the receiving portion in the second direction;

wherein the receiving portion is configured to receive a fiber optical component such that the fiber optical component urges the first biasing portion away from the second wall portion, and wherein a biasing force of the first biasing portion is configured to bias the fiber optical component against the second wall portion;

wherein the receiving portion is configured to receive a fiber optical component such that the fiber optical component urges the second biasing portion to increase the dimension of the receiving portion in the second direction, and wherein a biasing force of the second biasing portion is configured to bias the fiber optical component against a retaining portion in the second direction; and wherein the first biasing portion and the second biasing portion are configured to permit a dimension of the receiving portion to be varied such that the fiber optical component holder portion is configured to receive fiber optical components having various dimensions and/or multiple fiber optical components having same or different dimensions.

9. The fiber optic component holder of claim 8, wherein the fiber optical component holder portion is configured to hold a passive fiber optical component.

10. The fiber optic component holder of claim 8, wherein the fiber optical component holder portion is configured to hold a planar lightwave circuit splitter, a fused biconical taper splitter, or a wavelength division multiplexing module.

11. The fiber optic component holder of claim 8, further comprising a splice protector holder portion that is configured to hold a splice protector that is configured to protect spliced fibers.

12. The fiber optic component holder of claim 11, wherein the splice protector holder portion includes a plurality of splice protector holders; and wherein each splice protector holder is configured to hold a splice protector.

13. The fiber optic component holder of claim 8, wherein the fiber optical component holder portion includes two fiber optic component holder portions.

14. The fiber optic component holder of claim 8, wherein the first biasing portion includes two biasing structures.

15. The fiber optic component holder of claim 8, wherein the second biasing portion includes two biasing structures.

16. A fiber optic component holder for holding various sizes of fiber optical components or multiple fiber optical components comprising:

a fiber optical component holder portion configured to hold a fiber optical component;

wherein the fiber optical component holder portion is configured to include a receiving portion between a first wall portion and a second wall portion;

wherein the receiving portion is configured to receive a fiber optical component such that the fiber optical component urges a biasing portion to increase a dimension of the receiving portion, and wherein a biasing force of the biasing portion is configured to bias the fiber optical component against a retaining portion;

wherein the biasing portion includes two biasing structures that extend from a top surface of a base portion that extends between the first wall portion and the second wall portion; and wherein the biasing portion is configured to permit the dimension of the receiving portion to be varied such that the fiber optical component holder portion is configured to receive fiber optical components having various dimensions and/or multiple fiber optical components having same or different dimensions.

17. The fiber optic component holder of claim 16, wherein the fiber optical component holder portion is configured to hold a passive fiber optical component.

18. The fiber optic component holder of claim 16, wherein the fiber optical component holder portion is configured to hold a planar lightwave circuit splitter, a fused biconical taper splitter, or a wavelength division multiplexing module.

19. The fiber optic component holder of claim 16, further comprising a splice protector holder portion that is configured to hold a splice protector that is configured to protect spliced fibers.

20. The fiber optic component holder of claim 19, wherein the splice protector holder portion includes a plurality of splice protector holders; and wherein each splice protector holder is configured to hold a splice protector.

21. The fiber optic component holder of claim 16, wherein the fiber optical component holder portion includes two fiber optic component holder portions.

22. The fiber optic component holder of claim 16, wherein the two biasing structures are each configured to urge toward the base portion in a vertical direction.

23. The fiber optic component holder of claim 16, wherein the fiber optical component holder portion is configured to include a second biasing portion that is configured to extend from the first wall portion toward the second wall portion and to be urged away from the second wall portion to increase a second dimension of the receiving portion in a direction perpendicular to a direction of the dimension.

24. The fiber optic component holder of claim 23, wherein the second biasing portion includes two biasing structures.

* * * * *